United States Patent
Payne et al.

(10) Patent No.: US 7,324,008 B2
(45) Date of Patent: Jan. 29, 2008

(54) METHOD OF PREDICTING CONDITION DURING OPERATION OF AN ELECTRICAL MACHINE

(75) Inventors: Bradley S Payne, Leek (GB); Stephen M Husband, Derby (GB); Brian E Simmers, Derby (GB)

(73) Assignee: Rolls-Royce plc, London (GB)

(*) Notice: Subject to any disclaimer, the term of this patent is extended or adjusted under 35 U.S.C. 154(b) by 32 days.

(21) Appl. No.: 10/916,446

(22) Filed: Aug. 12, 2004

(65) Prior Publication Data

US 2005/0046414 A1  Mar. 3, 2005

(30) Foreign Application Priority Data

Aug. 20, 2003  (GB) ................. 0319553.4

(51) Int. Cl.
*G08B 21/00* (2006.01)

(52) U.S. Cl. ................. 340/679; 340/683; 702/183

(58) Field of Classification Search ............. 340/679, 340/683; 702/182, 183, 185, 186
See application file for complete search history.

(56) References Cited

U.S. PATENT DOCUMENTS

| | | | |
|---|---|---|---|
| 5,255,208 A | | 10/1993 | Thakore |
| 5,633,800 A | | 5/1997 | Bankert |
| 5,724,271 A | | 3/1998 | Bankert |
| 5,930,155 A | * | 7/1999 | Tohi et al. ................. 703/8 |
| 6,002,988 A | * | 12/1999 | Whaley et al. ............. 702/57 |
| 6,041,287 A | * | 3/2000 | Dister et al. ............... 702/182 |
| 6,606,580 B1 | * | 8/2003 | Zedda et al. .............. 702/185 |
| 6,694,285 B1 | * | 2/2004 | Choe et al. ................ 702/182 |
| 6,772,076 B2 | * | 8/2004 | Yamamoto et al. ......... 702/65 |
| 6,931,353 B2 | * | 8/2005 | Blazek ...................... 702/182 |

OTHER PUBLICATIONS

Bangura et al.; Comparison Between Characterization and Diagnosis of Broken Bars/End-Ring Connectors and Airgap Eccentricities of Induction Motors in ASD's Using a Coupled Finite Elements-State Space Method; IEEE, Mar. 2000.
Thomson et al.; An Industrial Case Study of On-Line Current Monitoring and Finite Element Analysis to Diagnose Airgap Eccentricity Problems in Large High Voltage 3-Phase Induction Motors; International Conference on Electrical Machines and Drives; Sep. 1, 1999.
Elkasabgy et al.; Detection of Broken Bars in the Cage Rotor on an Induction Machine; IEEE Transactions on Industry Applications; Jan. 1, 1992.
A. J. Mitcham; Transverse Flux Motors For Electric Propulsion of Ships; Proceedings of the 1997 IEE Colloquium on New Topologies for Permanent Magnet Machines; Jun. 18, 1997.
Husband et al.; The Rolls-Royce Transverse Flux Motor Development; Electric Machines and Drives Conference; IEEE International Jun. 1-4, 2003.

* cited by examiner

*Primary Examiner*—John Tweel, Jr.
(74) *Attorney, Agent, or Firm*—W. Warren Taltavull; Manelli Denison & Selter PLLC (57) ABSTRACT

Condition monitoring of an electrical machine is achieved by using electro-magnetic finite element analysis to analyse the machine based on model parameters corresponding with at least one fault condition. This allows the effect of the fault condition to be predicted. Metrology is used to recover live measurements for comparison with the predictions from the electro-magnetic finite element analysis to identify any fault signatures within the live measurements, in principle allowing those faults to be detected or diagnosed before they become catastrophic.

18 Claims, 5 Drawing Sheets

METHOD OF PREDICTING CONDITION DURING OPERATION OF AN ELECTRICAL MACHINE

FIELD OF THE INVENTION

The present invention relates to methods and apparatus for condition monitoring, particularly in relation to the operation of electrical machines.

BACKGROUND OF THE INVENTION

Many situations exist in which condition monitoring of an electrical machine is required, for example to detect and diagnose faults. Clear detection of faults is highly desirable, in order to identify them before they become unacceptable, and to minimise the risk of catastrophic failure during machine operation. The diagnosis of a forthcoming fault event is desirable to allow a better understanding of the fault, to allow appropriate spare parts to be available before the machine is dismantled for repair, and to identify the appropriate parts of the machine to dismantle for repair.

SUMMARY OF THE INVENTION

In accordance with the present invention there is provided a method of operating an electrical machine, wherein the operation of the machine is modelled by an electro-magnetic finite element analysis technique prior to operation, the analysis including an analysis based on model parameters corresponding with at least one fault condition, so that at least one effect of the fault condition is predicted, and in which operation of the machine is monitored during use, by comparison of live measurements with the results of the finite element analysis, thereby allowing the occurrence of the fault condition to be diagnosed.

In another aspect, the invention provides a method of predicting condition during operation of an electrical machine, wherein the operation of the machine is modelled by an electro-magnetic finite element analysis technique including an analysis based on model parameters corresponding with at least one fault condition so that at least one effect of the fault condition is predicted.

The machine may be a motor. For example, the invention may be applied to a transverse flux motor.

Preferably the electro-magnetic finite element analysis is used to predict at least one effect on magnetic flux within the machine, for comparison with live measurements of flux changes during operation. Search coils are preferably provided within the machine for providing live flux measurements. At least one search coil is preferably provided on the machine stator. At least one search coil is preferably provided on the machine rotor.

The machine may be a transverse flux machine having a disc with a rim of alternating permanent magnets and pole pieces, and a ring of core pieces, co-operating with the rim and having an energising coil arrangement associated therewith. At least one search coil is preferably located at a tip of one of the core pieces. At least one search coil is preferably located to detect changes of flux within the body of a core piece. At least one search coil is preferably located to detect changes of flux within the rim. The rim search coil may be located at a boundary between a permanent magnet and a pole piece.

The electro-magnetic finite element analysis is preferably further used to predict at least one effect detectable in the absence of drive currents to the machine.

The comparison of live measurements and finite element analysis results is preferably used to modify the fault condition predictions.

In a further aspect, the invention provides a machine condition monitoring means operable to monitor the condition of an electrical machine and including sensor means for recovering live measurements, the monitoring means being further operable to compare live measurements with the results of an electro-magnetic finite element analysis, the finite element analysis serving to model the operation of the machine and including an analysis based on model parameters corresponding with at least one fault condition, so that at least one effect of the fault condition is predicted by the model.

The machine may be a motor. For example, the invention may be applied to a transverse flux motor.

Preferably the electromagnetic finite element analysis is used to predict at least one effect on magnetic flux within the machine, for comparison with live measurements of flux changes during operation. Search coils are preferably provided within the machine for providing live flux measurements. At least one search coil is preferably provided on the machine stator. At least one search coil is preferably provided on the machine rotor.

The machine may be a transverse flux machine having a disc with a rim of alternating permanent magnets and pole pieces, and a ring of core pieces, operating with the rim and having an energising coil arrangement associated therewith. At least one search coil is preferably located at a tip of one of the core pieces. At least one search coil is preferably to detect changes of flux within the body of a core piece. At least one search coil is preferably located to detect changes of flux within the rim. The rim search coil may be located at a boundary between a permanent magnet and a pole piece.

The electro-magnetic finite element analysis is preferably further used to predict at least one effect detectable in the absence of drive currents to the machine.

The comparison of live measurements and finite element analysis results is preferably used to modify the fault condition predictions.

BRIEF DESCRIPTION OF THE DRAWINGS

Examples of the present invention will now be described in more detail, by way of example only, and with reference to the accompanying drawings, in which.

DETAILED DESCRIPTION OF THE INVENTION

An example of the invention will first be described by detailed reference to a particular machine in which the invention can be implemented and from which the advantages of the invention may be understood.

Transverse Flux Motor

Figure 1:
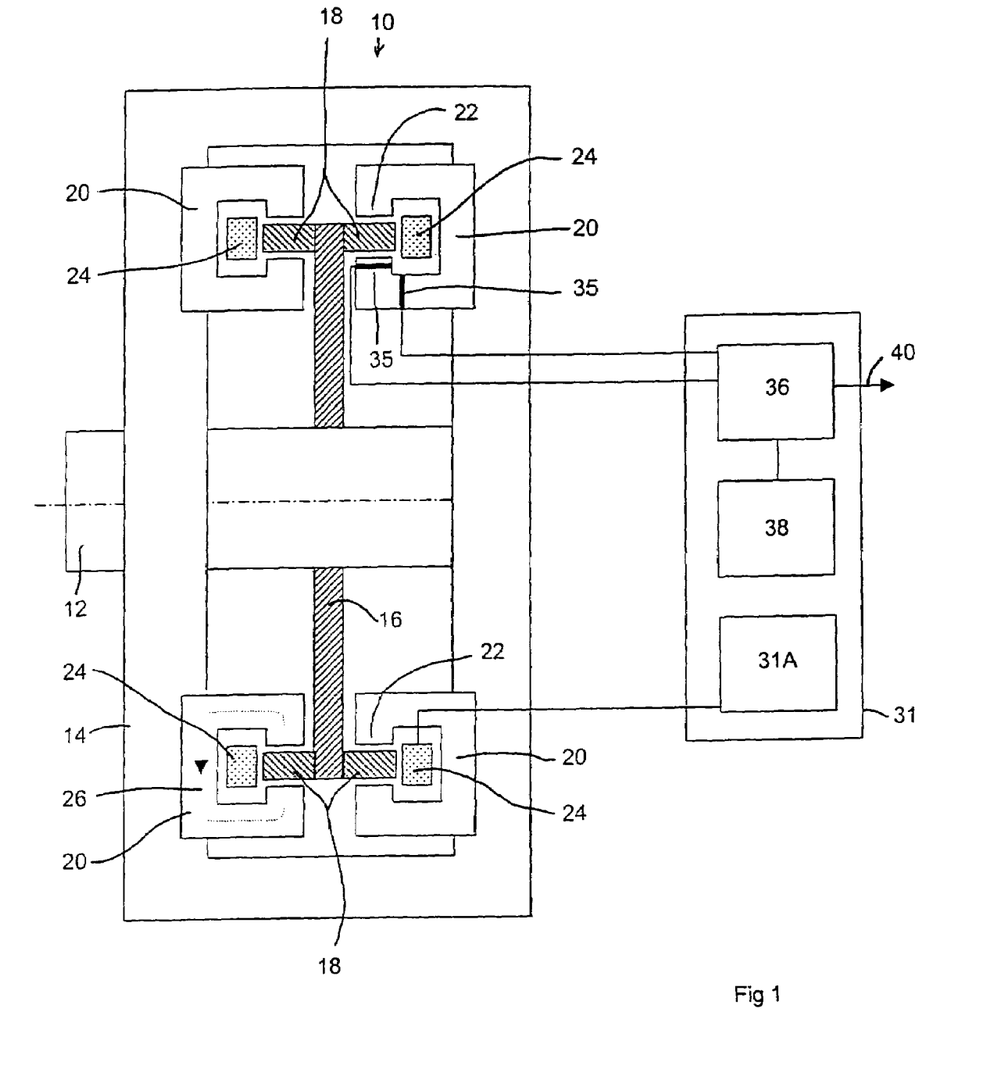
FIG. 1 is a diagrammatic section through a transverse flux motor, showing an example of the manner in which the present invention may be implemented.
Figure 2:
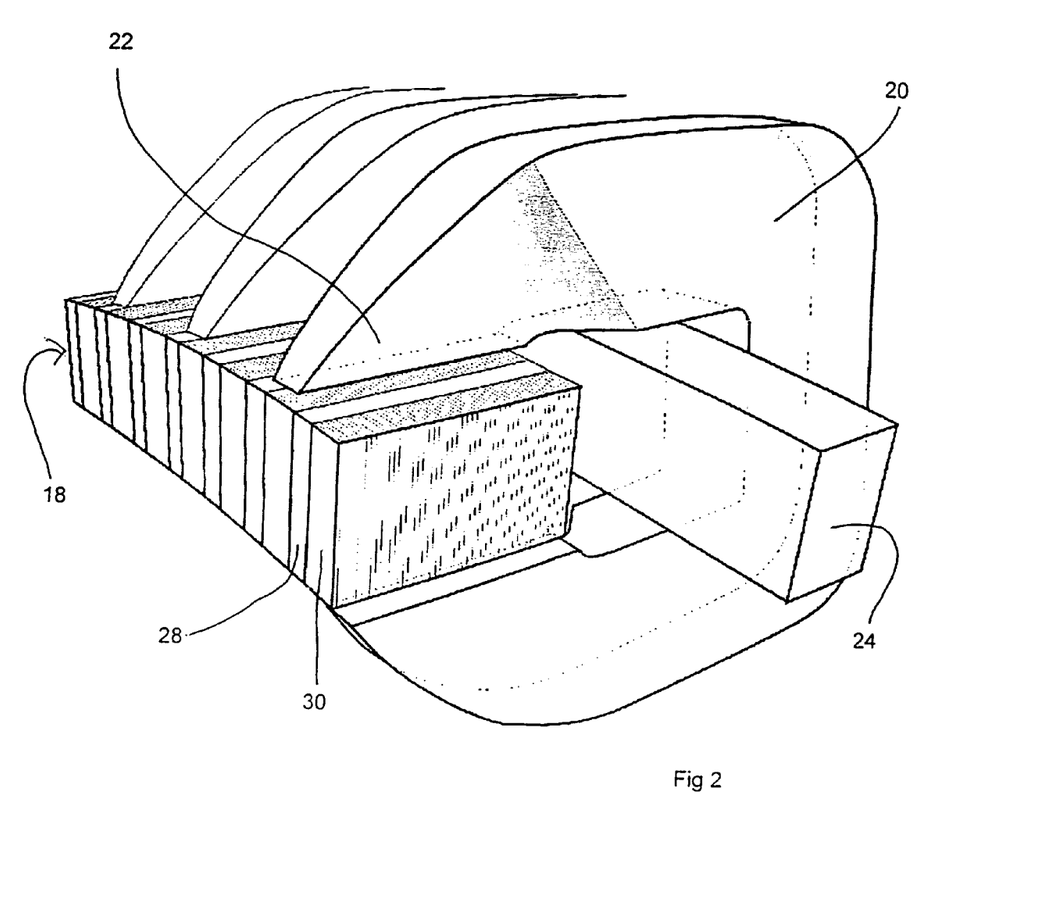
FIG. 2 is an enlarged perspective view of part of a rim and some of the stator cores of the motor of FIG. 1.

The machine illustrated primarily in FIGS. 1 and 2 is an electrical machine, specifically a transverse flux motor. The motor 10 is used to drive a rotary shaft 12, which rotates relative to a stator frame 14 by means of appropriate bearings (not shown).

The shaft 12 carries a disc 16, centred at the shaft 12. The disc 16 carries annular rims 18 projecting from the faces of the disc 16, generally parallel with the shaft 12. The frame 14 carries a ring of a generally C-shaped core pieces 20. The tips 22 of the core pieces 20 define a gap in which a respective rim 18 is received. An energising coil 24 is threaded through the core pieces 20 of each ring of core pieces, so that current in the corresponding coil 24 will create magnetic flux circulating around the core pieces 20, as indicated schematically by the arrow 26 in FIG. 1. It can be seen that this flux 26 crosses the gap between tips 22, passing through the rims 18.

The construction of the rim can be seen in more detail in FIG. 2. The rim 18 is formed as an alternating series of permanent magnets 28 separated by pole pieces 30 of readily magnetisable material such as soft iron.

It can be seen from FIG. 2 that the core pieces 20 are formed so that the tips 22 of each piece 20 are not in alignment across the rim 18. More specifically, when viewed at a plane transverse to the shaft 12, the tips 22 are not in radial alignment. The significance of this will be explained below.

As the shaft 12 turns, carrying the disc 16 and rims 18 with it, the magnets 28 and pole pieces 30 will pass in turn each core piece 20 and its tips 22. The shaft 12 is driven by interaction between the core pieces 20 and the rims 18, when the core pieces are energised by the coil 24 as will be discussed below. The drive provided by the TFM is improved by providing a second arrangement of the type described in relation to FIG. 1, mounted on the same shaft 12 and driven by a second electrical phase, coordinated with the first arrangement. This results in smoother drive to the shaft 12. A greater number of phases could alternatively be used, with respective phase angles selected to generate smooth torque on the shaft 12. In addition, each disc 16 could carry more than one rim 18 on each face, there being a corresponding ring of core pieces 20 for each rim.

Magnetic Arrangement

The magnetic conditions within the motor 10 can be modelled, for instance by a finite element analysis technique.

A finite element analysis technique which models the magnetic conditions within an electrical machine, including magnet-induced and current-induced flux, is called herein an "electro-magnetic finite element analysis", and consists of modelling the machine by notionally sub-dividing the entire machine (or the relevant sub-system) into small, but finite elements. Model parameters, such as material type, density, applied forces, permeability, electrical resistance, mechanical strength, applied current etc. are then applied to the finite element model to predict the conditions of each element, such as flux density, flux strength, temperature etc. The behaviour of the complete machine can then be predicted by combining the results of the predictions from each of the elements.

FIG. 3 illustrates four different electro-magnetic arrangements which arise as the disc 16 turns. FIG. 3 shows lines of the resultant magnetic flux (i.e. the combined magnetic-induced and current-induced magnetic flux) within the core pieces 20 and the rims 18 at various relative positions as the disc 16 turns.

Figure 3A:
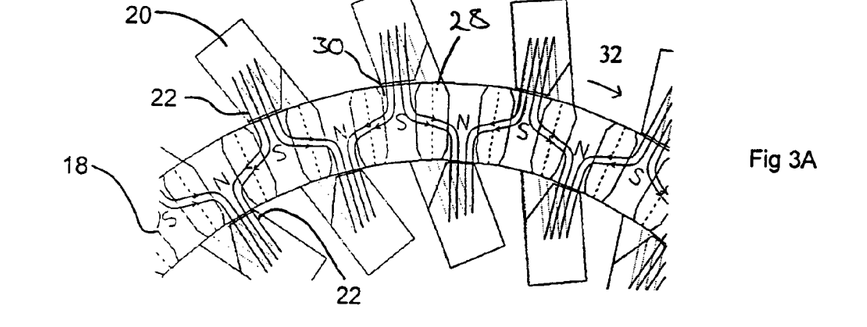
FIGS. 3A to 3D are diagrams of the combined magnet-induced and current-induced flux within the stator and rotor of the machine of FIG. 1, viewed at a plane perpendicular to the machine axis.

In FIG. 3*a*, the rims and core pieces are considered to be aligned in that each tip 22 faces a pole piece 30 of the rotor rim 18. The permanent magnets 28 are magnetised tangentially to the rim 18, i.e. circumferentially around the motor 10. This results in lines of flux passing from a tip 22 into the aligned pole piece 30, through the permanent magnets 28 to either side and into the neighbouring pole pieces 30, and then to the other tip 22 of the same or neighbouring core piece.

The position of the rotor shown in FIG. 3*a* can be considered as the position having 0° electrical angle.

Figure 3B:
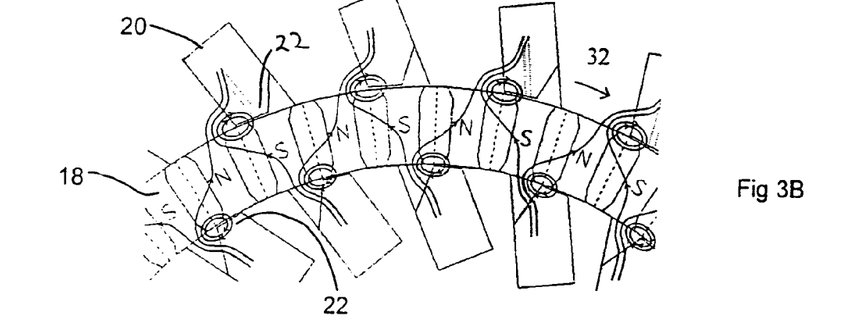

As the rim 18 rotates, in the direction of arrow 32, an intermediate position is reached (FIG. 3*b*). In this position, each tip 22 faces the junction between a permanent magnet 28 and a neighbouring pole piece 30. In comparison with FIG. 3A, the lines of flux are lengthened and loops of recirculating flux also arise between each tip 22 and the neighbouring permanent magnet 28. This is an unstable magnetic arrangement. Lines of flux across the air gap will seek to shorten themselves, enabling drive in the rotation direction 32.

Figure 3C:
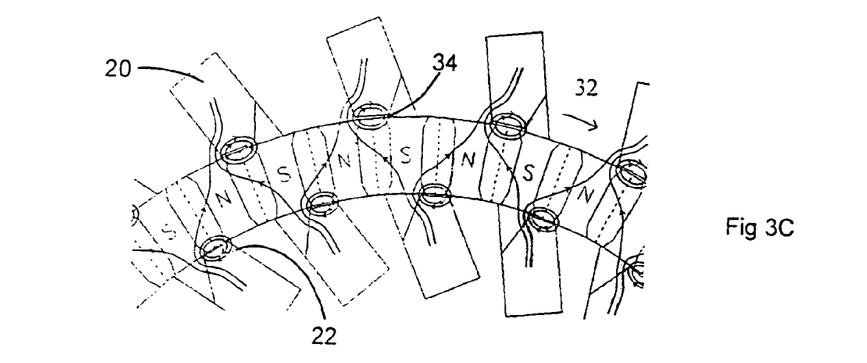

As rotation continues, the position of FIG. 3*c* is reached, in which the tips 22 are facing permanent magnets 28. A flux pattern emerges with similarities with the flux pattern shown in FIG. 3B, particularly in relation to the length of the flux paths and the presence of recirculating flux paths. This position is also unstable and maximum drive in the direction 32 is the result.

Figure 3D:
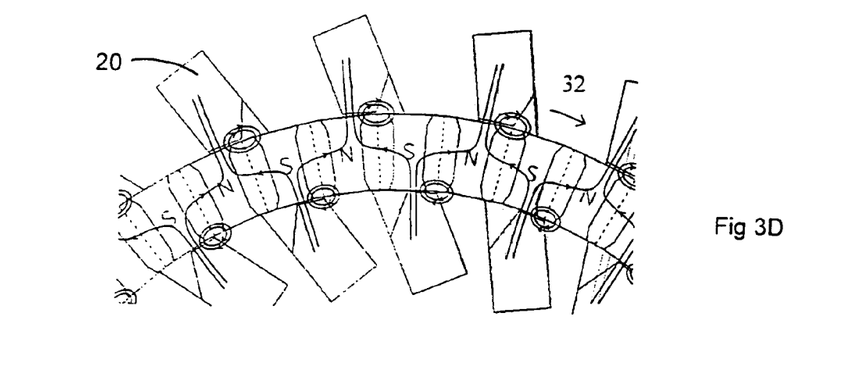

FIG. 3*d* is then reached, in which the tips 22 are facing the next boundary between a permanent magnet 28 and a pole piece 30. As in FIG. 3B, the lines of flux seek to shorten themselves, creating drive in the direction 32. Further rotation creates a stable flux pattern when the permanent magnets 28 move into alignment with the tips 22 in an arrangement similar to FIG. 3*a*, but with each tip 22 facing a pole piece 30 of opposite popularity as compared with FIG. 3*a*. Consequently, this final position can be considered the 180° electrical angle and thus, FIGS. 3*b, c* and *d* can be considered as 45°, 90° and 135° electrical angles.

It can be seen that in an ideal system, the arrangement has stability at 0° and 180° electrical angle and consequently, additional phases would normally be required in practice, as noted above, to provide continuous, smooth torque output to the shaft 12.

Search Coils

The drawings in FIG. 3 result from a relatively simple analysis of the magnetic flux within the motor 10. The drawings of FIG. 3 are useful for simplicity and clarity. However, electro-magnetic finite element analysis allows much more detailed predictions to be made in relation to, for example, flux densities at various locations within the machine, during normal use. These results allow locations to be identified at which fluxes or flux changes are relatively large. For example, even relatively simple analysis of FIG. 3 reveals large changes in flux in the region of the tips 22 as the motor 10 moves through its cycle, and also within the body of the core pieces 20 between the tips 22. Similarly, significant changes in flux strength are to be expected at boundaries between the permanent magnets 28 and the pole pieces 30.

Consequently, these three positions are preferred for locating search coils from which live measurements can be recovered while the machine is operating. Search coils may therefore be incorporated within the motor, during construction, so that live data of this nature may be recovered during operation.

In a particularly preferred arrangement, search coils are provided in all three of the locations mentioned above, but preferably not at each such location. Thus, some of the core pieces 20 may be selected for fitting with search coils, as may some of the junctions between permanent magnets 28 and pole pieces 30.

Figure 4A:
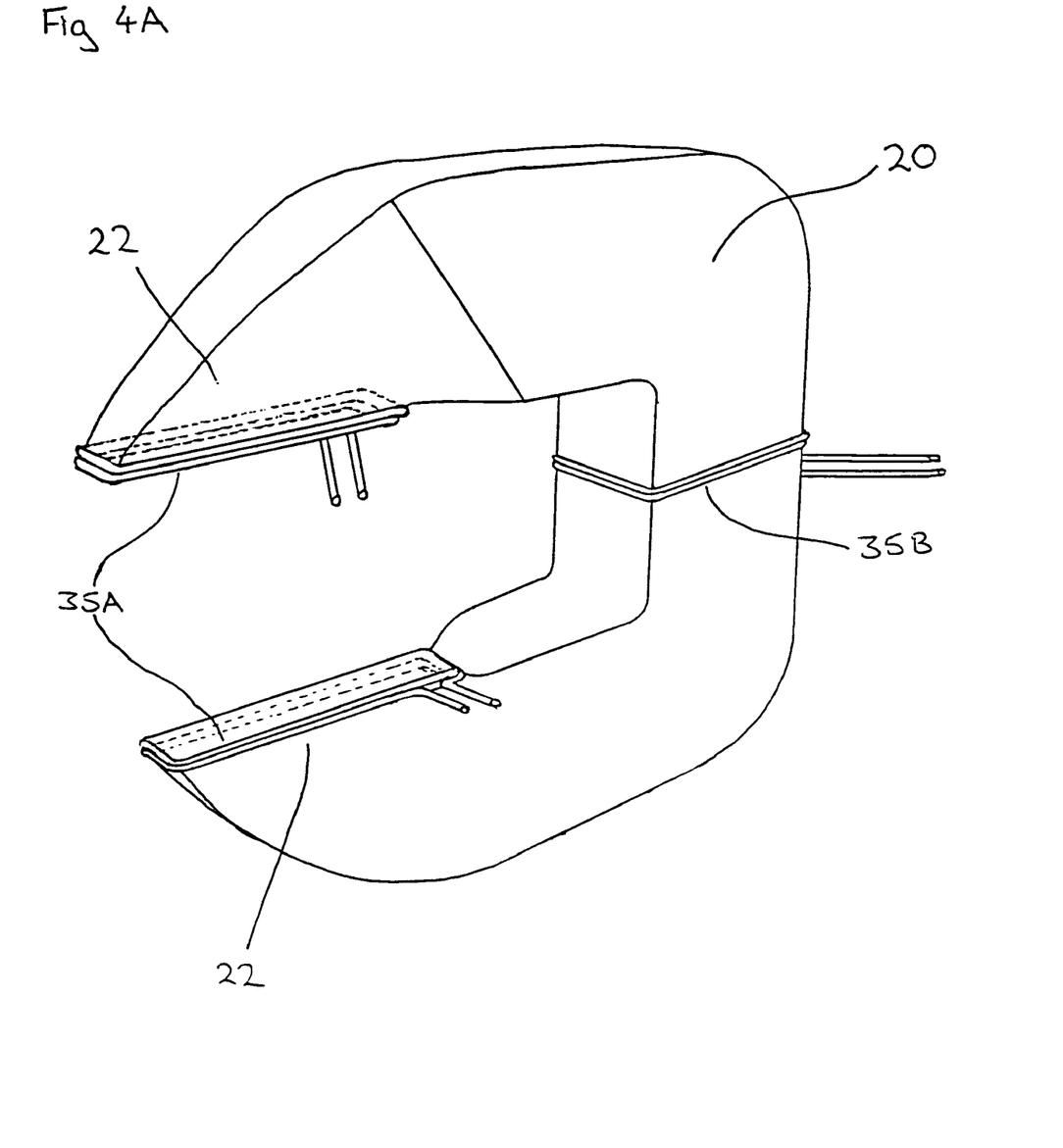
FIG. 4A is a stator core on an enlarged scale.
Figure 4B:
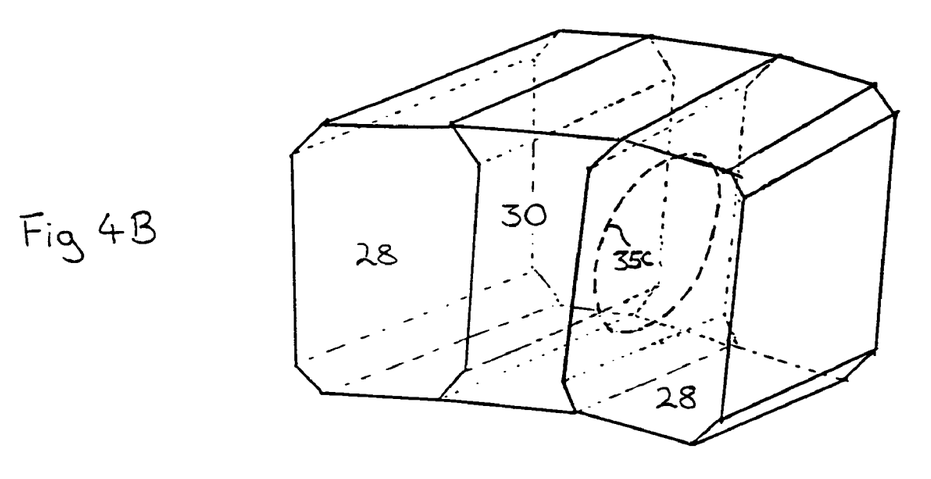
FIG. 4B is a portion of the rotor rim, on a further enlarged scale.

FIG. 4A shows a simplified form of a core piece for which tip search coils 35A and body search coils 35B have been provided. FIG. 4B illustrate, in simplified and enlarged form, the position of a search coil 35C at the interface between a permanent magnet 28 and neighbouring pole piece 30.

Finite Element Analysis of Faults

The arrangements described above allow a comparison between flux distribution expected during normal operation (as shown in FIG. 3), and the flux distribution detected by the search coils during live operation. This provides valuable information to validate assumptions and predictions made during the process of designing the motor 10.

In accordance with the present invention, electro-magnetic finite element analysis is used for further benefit, as follows.

In addition to making predictions about the machine during normal operation, electro-magnetic finite element analysis can be performed on the basis of alternative model parameters, such as model parameters corresponding with at least one fault condition. Such an analysis could assume that a region of the motor is not performing to design, but in a non-catastrophic manner. For example, a component (such as one of the core pieces 20) could be assumed to be misaligned. Having changed the appropriate physical property in the model to reflect this assumption, an electro-magnetic finite element analysis of the complete machine can then be conducted again, revealing the expected flux patterns within the machine, when this fault condition is present. The result is a prediction of the effect of the fault condition, from the finite element analysis. In particular, the result allows the prediction of the measurements which will be recovered from the search coils 24 when the fault condition is present.

In principle, these predictions could be made by applying finite element analysis to situations in which boundary conditions assume that the variations from normal operation are of a magnitude sufficiently small to be acceptable within the working tolerances of the machine, but sufficiently large to be detectable in live measurements from the search coils 35.

For a complex machine, many different finite element analyses can be conducted in this way, based on various fault condition boundary conditions, each yielding a prediction of the live measurements which will be recovered from the coils 35. In principle, each of these predictions will reveal a unique set of predicted measurements which are characteristic of the particular fault assumed. Thus, the appearance of this combination of live measurements can be considered as indicating the occurrence of that fault.

Within a transverse flux motor of the type described above, various different fault conditions could be modelled by finite element analysis, and each could be modelled at various magnitudes of the fault. For example, the following faults could be modelled:

1. Movement or misalignment of a component, such as creep of the core pieces 20 or tips 22;
2. Delamination of any of the components, such as the core pieces 20;
3. Overheating of a component, such as the core pieces 20, for example due to increased losses;
4. Breakdown of insulation within laminated components, resulting in shorting of laminations;
5. Vibration of components, either axially, radially, circumferentially or in more complex modes;
6. A decrease in magnetic strength, of magnets, due to overheating or demagnetisation;
7. Eccentric running of the shaft 12;
8. Increased rotor losses (as a result of shorted pole piece laminations);
9. Ineffective flux linkage, for example due to displacement of the coil 24, insulation breakdown within the coil, vibration of the coil, or problems with drive circuitry;
10. Mechanical and electrical misalignment, such as problems with drive arrangements, control arrangements or core placement;

Apart from the faults number 4, 9 and 10 in the above list, these faults can be analysed in two different ways. First, they can be monitored during normal operation of the motor, to provide a search coil signature for live measurements. Secondly, they may be monitored when the motor is turned (by an external drive arrangement) in the absence of drive current in the coils 24. This rotation will create various flux patterns within the machine, by virtue of the presence of permanent magnets 28 and consequently, various signature coil measurements will be retrieved which will differ from those retrieved in the presence of the same fault condition and with drive current present.

The use of search coils has the further advantage that the measurements are local to the coil and thus can be used to identify local faults within the machine. For example, a coil on the rotor will respond to a stator fault only when in the vicinity of a fault. Conversely, a coil on the stator will only respond to a fault in the rotor when the corresponding part of the rotor is passing the search coil. Thus, consideration of the measurement signatures of the faults, and the timing of those signatures, would allow an identification to be made of the type of fault and its location.

Condition Monitoring

The arrangements described above can be used in relation to condition monitoring of the machine, when in operation, with particular advantages in relation to advanced warning of fault conditions. Thus, it is envisaged that the control arrangements 31 for the motor 10, in addition to providing drive circuits 31A for the coils 24, should incorporate within them suitable processing arrangements 36 to receive live measurements from the search coils 35 and to process these to identify any fault signatures within those measurements. This can be done by comparison with a library of fault signatures held in memory at 38. The memory 38 may also contain information relating to a finite element analysis corresponding with operation of the machine in the absence of faults.

Continuous comparison by the processing arrangement 36, between the live measurements being received from the search coils 35, and the predictions contained in the memory 38 allows an alert signal to be sent at 40, as soon as the processing arrangement 36 determines that the comparison has detected a fault signature. The alert signal 40 can be used to indicate the nature of the fault which has been detected, the seriousness of that fault and, if appropriate, the location.

Comparison by the processing arrangement 36 can also be used to provide iterative improvement of the predictions in memory 38 relating to correct (non-fault) operation of a machine. It is possible to envisage that the predictions from the electro-magnetic finite element analysis model for correct running of the machine are not precisely the same as the live measurements recovered, because of inaccuracies within the analysis rather than faults within the machine. In these circumstances, the processing arrangement 36 would repeatedly recover a difference between live measurements and predictions within the memory 38, but those differences would not correspond with any of the fault signatures. An appropriate function could be incorporated within the processing arrangement to allow the correct running predictions within the memory 38 to be iteratively updated to reflect more accurately the measurements recovered from actual live running, thus increasing the sensitivity of the processing arrangement 36 to any deviation from normal measurements.

The processing arrangement 36 may also be provided with sensors for other parameters, such as current, and including non-electrical parameters, such as temperature or vibration, to further improve the results.

Other Machines

The description set out above has related solely to a transverse flux motor, and particularly to magnetic flux within the machine. However, electro-magnetic finite element analysis techniques can be used in many other ways, and in other types of electrical machine. In other electrical machines, the nature of the faults concerned may be different, being specific to the machine under consideration. Similarly, the metrology involved would be different. Nevertheless, the underlying principles of the invention would again apply, namely that the system is analysed by finite element analysis based on boundary conditions corresponding with at least one fault condition. This allows the effect of the fault condition to be predicted. The metrology used in the system can then recover measurements for comparison with the predictions to identify any fault signatures, in principle allowing those faults to be detected or diagnosed before they become catastrophic.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method of operating an electrical machine, wherein the operation of the machine is modeled by an electro-magnetic finite element analysis technique prior to operation, the analysis including an analysis based on model parameters corresponding with at least one fault condition, so that at least one effect of the fault condition is predicted, and in which operation of the machine is monitored by search coil means, by comparison of live measurements from said search coil means with the results of the finite element analysis thereby allowing the occurrence of the fault condition to be diagnosed.

2. A method of predicting condition during operation of an electrical machine, wherein the operation of the machine is modeled by an electro-magnetic finite element analysis technique including an analysis based on model parameters corresponding with at least one fault condition wherein the machine is monitored by search coil means, the measurements of said search coil means being compared with the results of the finite element analysis in order to predict the at least one fault condition.

3. A method according to claim 1, wherein the electro-magnetic finite element analysis is used to predict at least one effect on magnetic flux within the machine, for comparison with live measurements of flux changes during operation.

4. A method according to claim 1, wherein the electro-magnetic finite element analysis is further used to predict at least one effect detectable in the absence of drive currents to the machine.

5. A method according to claim 1, wherein the comparison of live measurements and finite element analysis results is used to modify the fault condition predictions.

6. A machine condition monitoring means operable to monitor the condition of an electrical machine and including sensor means comprising search coils for recovering live measurements, the monitoring means being further operable to compare live measurements with the results of an electro-magnetic finite element analysis, the finite element analysis serving to model the operation of the machine and including an analysis based on model parameters corresponding with at least one fault condition, so that at least one effect of the fault condition is predicted by the model.

7. A machine according to claim 6, wherein the machine is a motor.

8. A machine according to claim 6, wherein the electro-magnetic finite element analysis is used to predict at least one effect on magnetic flux within the machine, for comparison with live measurements of flux changes during operation.

9. A machine according to claim 8, wherein search coils are provided within the machine for providing live flux measurements.

10. A machine according to claim 9, wherein at least one search coil is provided on the machine stator.

11. A machine according to claim 9, wherein at least one search coil is provided on the machine rotor.

12. A machine condition monitoring means operable to monitor the condition of an electrical machine and including sensor means comprising search coils for recovering live measurements, the monitoring means being further operable to compare live measurements from said sensor means with the results of an electro-magnetic finite element analysis, the finite element analysis serving to model the operation of the machine and including an analysis based on model parameters corresponding with at least one fault condition, so that at least one effect of the fault condition is predicted by the model wherein said machine being a transverse flux machine having a disc with a rim of alternating permanent magnets and pole pieces, and a ring of core pieces, operating with the rim and having an energizing coil arrangement associated therewith.

13. A machine according to claim 12, having at least one search coil located at a tip of one of the core pieces.

14. A machine according to claim 12, having at least one search coil to detect changes of flux within the body of a core piece.

15. A machine according to claim 12, having at least one search coil located to detect changes of flux within the rim.

16. A machine according to claim 15, wherein the rim search coil is located at a boundary between a permanent magnet and a pole piece.

17. A machine according to claim 6, wherein the electromagnetic finite element analysis is further used to predict at least one effect detectable in the absence of drive currents to the machine.

18. A machine according to claim 17, wherein the comparison of live measurements and finite element analysis results is used to modify the fault condition predictions.

* * * * *